UNITED STATES PATENT OFFICE.

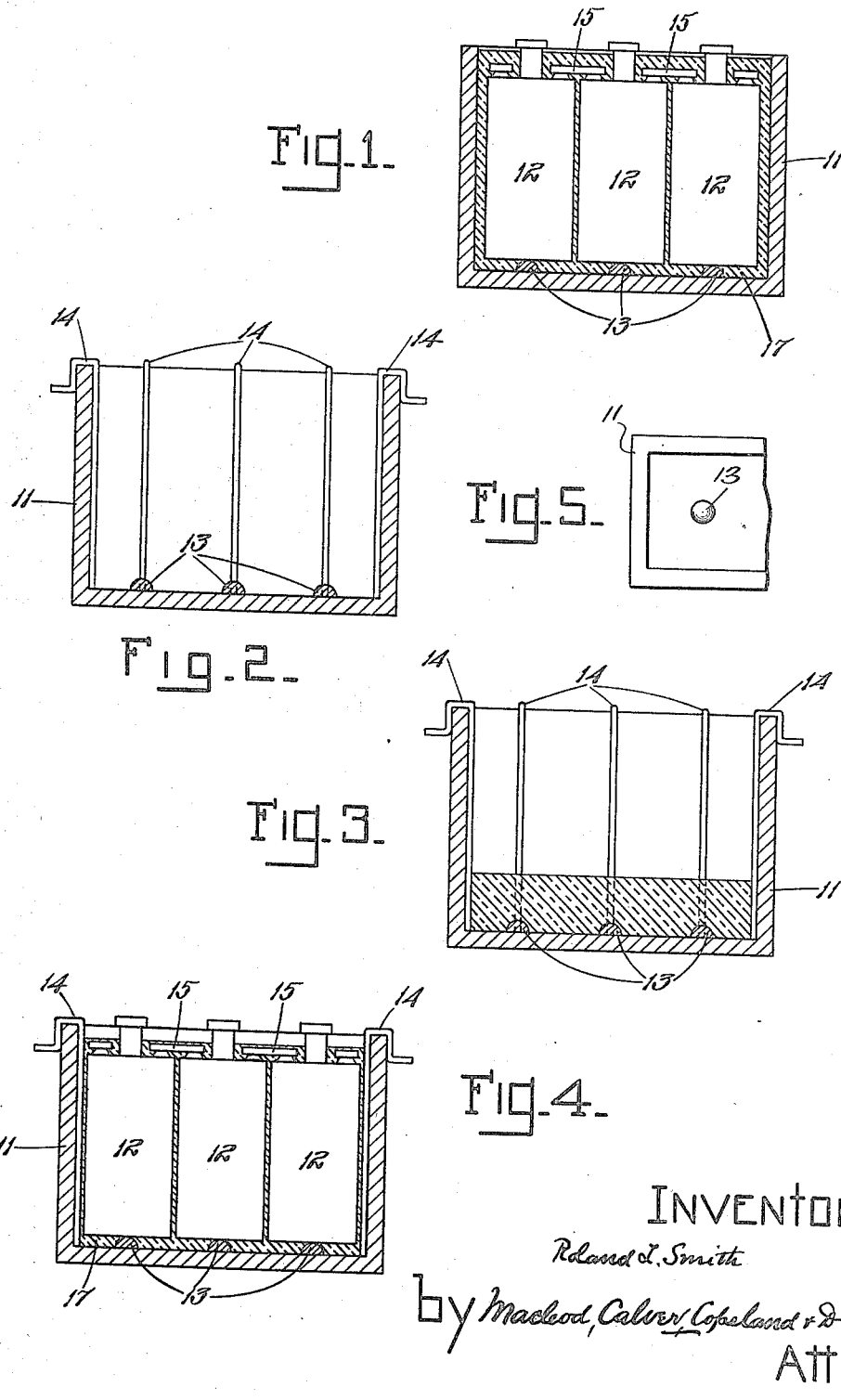

ROLAND L. SMITH, OF EVERETT, MASSACHUSETTS.

STORAGE BATTERY AND METHOD OF MAKING SAME.

1,239,835.  Specification of Letters Patent.  Patented Sept. 11, 1917.

Application filed May 17, 1917. Serial No. 169,211.

*To all whom it may concern:*

Be it known that I, ROLAND L. SMITH, a citizen of the United States, residing at Everett, county of Middlesex, State of Massachusetts, have invented a certain new and useful Improvement in Storage Batteries and Methods of Making Same, of which the following is a specification, reference being had therein to the accompanying drawings.

My invention has for its object a new and improved storage battery and process of making the same. Heretofore great difficulty has been experienced with storage batteries which contain a liquid electrolyte composed of acid, owing to the fact that leakage frequently occurs.

Where the battery is to be used for portable purposes the leakage of acid is very undesirable as it injures metal work, floors, carpets and the like, as well as doing injury to the battery itself.

In batteries as heretofore constructed, one chief cause of leakage has been the fact that the cells of the battery have rested directly on the floor of the battery box, or if the cells have not rested directly on the floor, the layer of hardened compound or pitch between the bottom of the cells and the floor of the battery box has been imperfect, and in either case leakage has easily taken place. The acid tends to creep up the terminals and then run down the sides of the cells escaping to the exterior through any crack or breach in the compound.

In the battery embodying my invention, which battery is also made in accordance with my novel process herein described, a perfect layer of compound is formed between the bottom of the cells and the battery box and between the cells and the sides of the box, with the result that leakage is impossible. My process also makes it possible to produce a battery in which the thickness of the layer of pitch or compound surrounding the cell or cells is practically uniform throughout, and in which weak spots in the layer of compound due to air bubbles are practically eliminated.

The invention will be fully understood from the following description, taken in connection with the accompanying drawings, and the novel features thereof are pointed out and clearly defined in the claims at the end of the specification.

Referring to the drawings, Figure 1 is a longitudinal section of a battery embodying my invention and made in accordance with the herein described novel process.

Fig. 2 is a similar section of the battery box, the supporting members and side spacers being in place to receive the cells.

Fig. 3 is a section of the parts as shown in Fig. 2 after a portion of the compound has been put in ready to receive the cells.

Fig. 4 is a similar section after the cells have been put in place.

Fig. 5 is a view of one of the buttons in place on a portion of the bottom of the battery box.

In the drawings, 11 designates the battery box which is ordinarily made of wood and which must be protected from the action of acid. 12 shows the cells which contain the plates and liquid electrolyte. The foregoing parts are of the ordinary well known construction and therefore do not require to be explained in detail.

In practising my improved method of making batteries, I take the battery box 11, (see Fig. 2) and place in the center of the space beneath each cell a supporting member or button 13 (see also Fig. 5), of some insulating material, preferably rubber. The height of this button is equal to the thickness of the layer of compound which it is desired to have beneath the cells. I then hang over the edge of the box a series of temporary spacers 14, composed preferably of wires of a diameter slightly less than the desired thickness of the layer of compound to be found between the cells and the walls of the battery box. The upper ends of the temporary spacers 14 are bent as shown in Fig. 2 so that they will engage the upper edges of the box and in this manner be held closely to the inside of the battery box.

The battery box is then filled, see Fig. 3, to the depth of perhaps an inch with the heated compound in liquid condition. Various compounds are adapted for this use, and are well known to those skilled in the art, and therefore will not be described in detail. The amount of compound placed in the box will be carefully determined and will be just sufficient so that when the cells are in place it will rise to a point just over the connectors 15, 15, but quite a little below the top edge of the battery box. After the compound has been poured into the box the cells 12 are lowered into place, as shown in Fig. 4. As they are lowered, the compound rises in the spaces between the cells and the inside of the box and between the adjacent faces of the cells. The cells then rest on the rubber buttons 13 and are kept out of contact with the inside of the battery box by the spacers 14. The foregoing procedure is such that air bubbles are not formed in the compound and there are no unfilled or weak places which are likely to result in cracks or in leakage. The compound is then allowed to harden and just before it sets the spacers 14 are gently pulled out without disturbing the cells. If this is done at the right time, portions of the compound will be sufficiently fluid to flow into the holes left by the removal of the spacers 14, while other portions of the compound which have already set are sufficiently firm to prevent the accidental displacement of the cells during the hardening process. After the compound has hardened completely additional compound is introduced to bring the level to the height shown in Fig. 1.

A battery jar constructed in this manner has the cells 12 supported on the layer 17 of hardened insulating compound except at the point occupied by the rubber buttons or supports 13. These are of small area and are themselves embedded in and surrounded by the hardened compound and are acid-resistant. Being located at substantially the center of each cell any acid which exudes from the cells at the terminals must follow down the outside of the cells and across the bottom to reach the rubber buttons. This is practically impossible, and the result is that the cells are practically proof against leakage.

When constructed in accordance with the herein described process embodying my invention, they cost no more than batteries as heretofore constructed, but are capable of use in places where serious injury would result if batteries constructed as heretofore were employed. They are also especially adapted for portable batteries which are carried about by hand from place to place, and therefore are subjected to rough usage.

What I claim is:

1. The improved battery having a battery box and a cell therein, a supporting member beneath the cell, and in contact with both the battery box and the cell, and a layer of hardened insulating compound surrounding said supporting member and interposed between the cell and the battery box.

2. The improved battery comprising a box and a cell therein, a rubber button resting on the bottom of the battery box and in contact with the under side of the said cell and a layer of hardened compound surrounding the said button and interposed between the cell and the box.

3. The novel method of making batteries which consists in placing in the battery box an insulating acid resisting support in position to support the cell, filling the battery box partly with melted insulating compound, and then putting the cell in place with its bottom resting on the said support.

4. The novel method of making a battery which consists in placing in the battery box an insulating acid resisting button in position to support the cell and placing temporary spacers against the inside of the box, filling the battery box partly with melted insulating compound, putting the cell in place with its bottom resting on said support, allowing the compound to solidify partly, and then removing the temporary spacers.

5. The novel method of making a battery which consists in placing an insulating acid resisting button in the battery box in position to support the cell, placing temporary spacers against the inside of the box, filling the battery box partly with melted insulating compound, then putting the cell in place with its bottom resting on the said button, and after the compound is partly hardened, and while a portion of it is still liquid, removing the said temporary spacers.

6. The novel method of making a battery which consists in placing an insulating acid resisting button in the battery box in position to support the cell, placing temporary spacers against the inside of the box, filling the battery box partly with melted insulating compound, then putting the cell in place with its bottom resting on the said button, and after the compound is partly hardened, and while a portion of it is still liquid, removing the said temporary spacers, and adding more melted compound to bring the compound to a predetermined level.

In testimony whereof I affix my signature.

ROLAND L. SMITH.